United States Patent
Chen et al.

(10) Patent No.: US 9,602,173 B2
(45) Date of Patent: Mar. 21, 2017

(54) ANTENNA STRUCTURE AND MOBILE DEVICE

(71) Applicant: Wistron NeWeb Corp., Hsinchu (TW)

(72) Inventors: Liang-Kai Chen, Hsinchu (TW);
Jen-Hao Cheng, Hsinchu (TW);
Yuan-Chin Hsu, Hsinchu (TW);
Tzu-Min Wu, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 84 days.

(21) Appl. No.: 14/700,796

(22) Filed: Apr. 30, 2015

(65) Prior Publication Data

US 2015/0357716 A1    Dec. 10, 2015

(30) Foreign Application Priority Data

Jun. 5, 2014  (TW) .............................. 103119503 A

(51) Int. Cl.
 *H01Q 1/24* (2006.01)
 *H04B 5/00* (2006.01)

(52) U.S. Cl.
 CPC ................................. *H04B 5/0081* (2013.01)

(58) Field of Classification Search
 CPC .................................................... H04B 5/0081
 USPC ......................................... 343/702, 700 MS
 See application file for complete search history.

(56) References Cited

U.S. PATENT DOCUMENTS

| | | | |
|---|---|---|---|
| 7,812,783 B2 | 10/2010 | Mak et al. | |
| 8,514,083 B2* | 8/2013 | Mani ................ | G06K 19/07749 174/250 |
| 2014/0035793 A1* | 2/2014 | Kato ...................... | H01Q 1/243 343/867 |
| 2014/0295199 A1* | 10/2014 | Baarman ................ | C08L 63/00 428/565 |

FOREIGN PATENT DOCUMENTS

| | | |
|---|---|---|
| CN | 1371143 A | 9/2002 |
| TW | 201414382 A | 4/2014 |
| WO | WO2004/006387 A1 | 1/2004 |
| WO | WO2012144482 A1 | 10/2012 |

* cited by examiner

*Primary Examiner* — Khai M Nguyen
(74) *Attorney, Agent, or Firm* — Muncy, Geissler, Olds & Lowe, P.C.

(57) ABSTRACT

An antenna structure includes a ferromagnetic patch, first metal conductive lines, second metal conductive lines, and metal connection elements. The ferromagnetic patch has a first surface and a second surface, and the second surface is opposite to the first surface. The first metal conductive lines are disposed on the first surface of the ferromagnetic patch. The second metal conductive lines are disposed on the second surface of the ferromagnetic patch. The metal connection elements penetrate the ferromagnetic patch. The metal connection elements further connect the first metal conductive lines to the second metal conductive lines, respectively.

19 Claims, 13 Drawing Sheets

ANTENNA STRUCTURE AND MOBILE DEVICE

CROSS REFERENCE TO RELATED APPLICATIONS

This application claims priority of Taiwan Patent Application No. 103119503 filed on Jun. 5, 2014, the entirety of which is incorporated by reference herein.

BACKGROUND OF THE INVENTION

Field of the Invention

The disclosure generally relates to an antenna structure, and more particularly, to an NFC (Near Field Communication) antenna structure.

Description of the Related Art

NFC (Near Field Communication) is also called "short-distance wireless communication", which is a wireless communication technology used in a short-distance range. NFC allows electronic devices to perform non-contact point-to-point data transmission to each other within a 10 cm (3.9 inches) range. Since NFC technology requires relatively low frequency, the corresponding antenna element for NFC needs a longer resonant path. However, the inner space of a mobile device is limited, and therefore it becomes a critical challenge for an antenna designer to design a small-size, high-performance NFC antenna for covering the desired frequency band.

BRIEF SUMMARY OF THE INVENTION

In an embodiment, the disclosure is directed to an antenna structure, including: a ferromagnetic patch, having a first surface and a second surface, wherein the second surface is opposite to the first surface; a plurality of first metal conductive lines, disposed on the first surface; a plurality of second metal conductive lines, disposed on the second and a plurality of metal connection elements, penetrating the ferromagnetic patch, wherein the metal connection elements connect the first metal conductive lines to the second metal conductive lines, respectively.

In some embodiments, the ferromagnetic patch includes a ferrite layer. In some embodiments, a coil structure for surrounding the ferromagnetic patch is formed by the first metal conductive lines, the metal connection elements, and the second metal conductive lines. In some embodiments, the first metal conductive lines and the second metal conductive lines have straight-line shapes. In some embodiments, the antenna structure operates in an NFC (Near Field Communication) frequency band. In some embodiments, a main beam of the antenna structure is arranged in a direction parallel to the first surface and the second surface. In some embodiments, the first metal conductive lines have a plurality of vertical projections on the second surface, and the vertical projections are not parallel to the second metal conductive lines. In some embodiments, an angle between each of the vertical projections and each of the second metal conductive lines is from 0 to 45 degrees. In some embodiments, spacing between any two adjacent first metal conductive lines is from 0 mm to 10 mm, and spacing between any two adjacent second metal conductive lines is from 0 mm to 10 mm. In some embodiments, the total number of first metal conductive lines is three or more, and the total number of second metal conductive lines is three or more. In some embodiments, spacing between any two adjacent first metal conductive lines is different, and spacing between any two adjacent second metal conductive lines is different. In some embodiments, one or more of the first metal conductive lines and/or one or more of the second metal conductive lines have a plurality of parallel slots. In some embodiments, the parallel slots have narrow, long rectangular shapes.

In some embodiments, the ferromagnetic patch further includes a first PET (Polyethylene Terephthalate, PET) layer, a second PET layer, a first gel layer, and a second gel layer, the first gel layer is configured to adhere the first PET layer to the ferrite layer, the second gel layer is configured to adhere the second PET layer to the ferrite layer, and the ferrite layer is disposed between the first PET layer and the second PET layer. In some embodiments, the first metal conductive lines, the second metal conductive lines, and the metal connection elements are formed by a first metal layer and a second metal layer. In some embodiments, the first metal layer is formed on a nonconductive ink layer by applying a displacement process to the nonconductive ink layer. In some embodiments, the second metal layer is formed on the first metal layer by applying a thickening process to the first metal layer. In some embodiments, the nonconductive ink layer includes base metal powder and epoxy. In some embodiments, the first metal layer and the second metal layer each include copper, nickel, silver, palladium, platinum, aluminum, or gold. In some embodiments, the antenna structure is combined with a mobile device, such that a proximity card receives radiation energy in multiple directions from the mobile device.

In an embodiment, the disclosure is directed to a mobile device, including: a first metal plane, having a slot gap; a second metal plane; and an antenna structure as claimed above, wherein the antenna structure is disposed between the first metal plane and the second metal plane.

In some embodiments, radiation energy of the antenna structure is transmitted outwardly through the slot gap. In some embodiments, radiation energy of the antenna structure is transmitted outwardly through a side clearance between the first metal plane and the second metal plane. In some embodiments, the mobile device further includes: one or more metal connection components, wherein the first metal plane is divided into two portions by the slot gap, and the metal connection components extend across the slot gap and are coupled between the portions of the first metal plane.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1A:
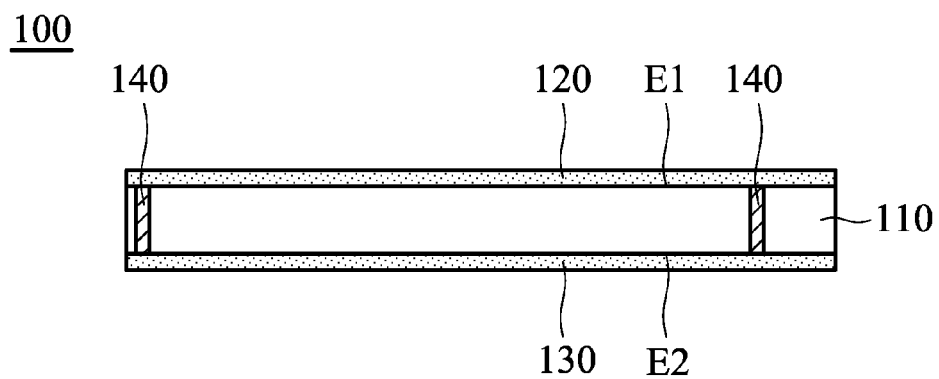
FIG. 1A is a cross-sectional view of an antenna structure according to an embodiment of the invention.
Figure 1B:
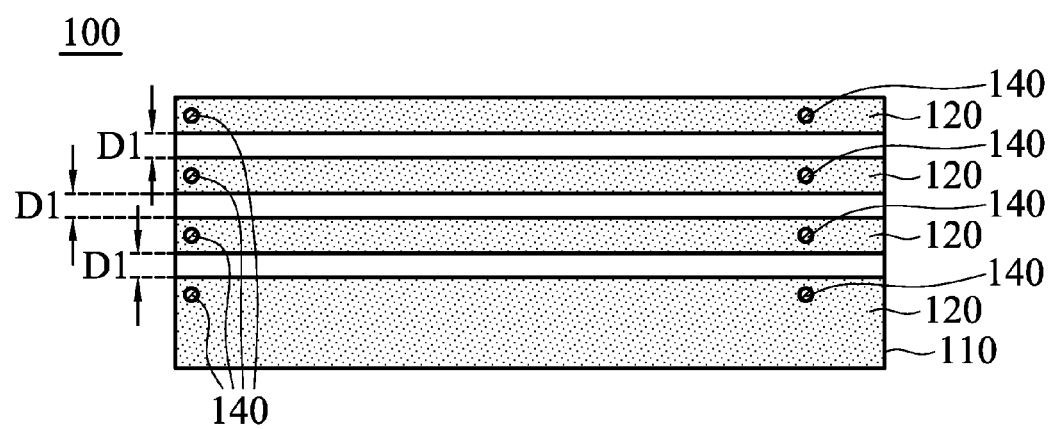
FIG. 1B is a front view of an antenna structure according to an embodiment of the invention.
Figure 1C:
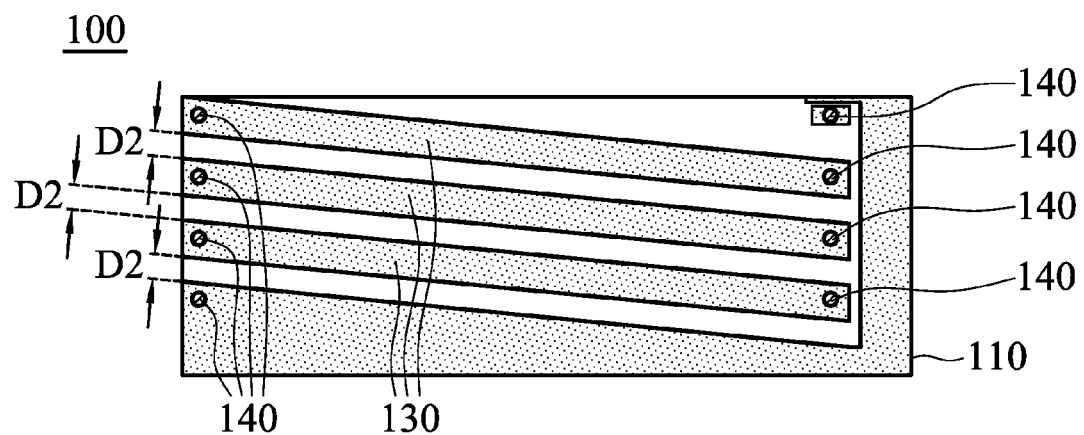
FIG. 1C is a rear view of an antenna structure according to an embodiment of the invention.
Figure 1D:
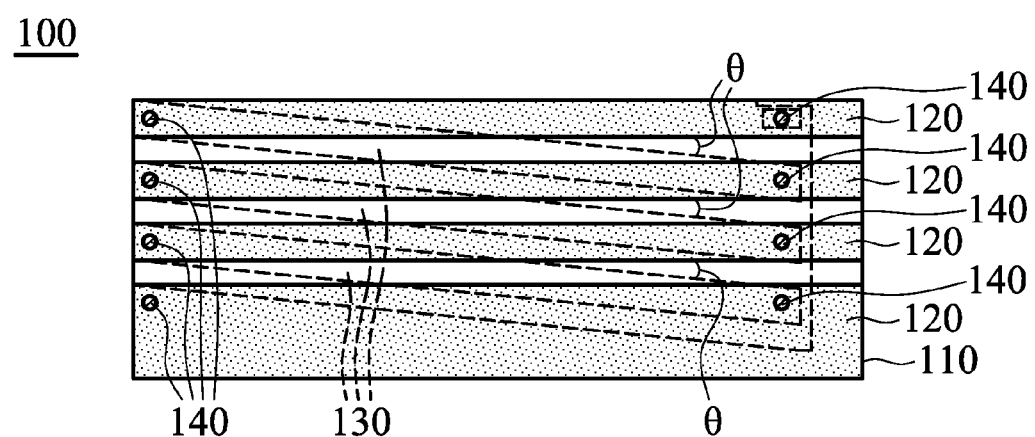
FIG. 1D is a perspective view of an antenna structure according to an embodiment of the invention.

FIG. 1A is a cross-sectional view of an antenna structure 100 according to an embodiment of the invention. FIG. 1B is a front view of the antenna structure 100 according to an embodiment of the invention. FIG. 1C is a rear view of the antenna structure 100 according to an embodiment of the invention. FIG. 1D is a perspective view of the antenna structure 100 according to an embodiment of the invention. Please refer to FIG. 1A, FIG. 1B, FIG. 1C, and FIG. 1D together. The antenna structure 100 may be applied to a mobile device, such as a smartphone, a tablet computer, or a notebook computer. The antenna structure 100 includes a ferromagnetic patch 110, first metal conductive lines 120, second metal conductive lines 130, and metal connection elements 140. In some embodiments, the ferromagnetic patch 110 includes a ferrite layer. The ferromagnetic patch 110 has a first surface E1 and a second surface E2, and the second surface E2 is opposite to the first surface E1. The first metal conductive lines 120 are disposed on the first surface E1 of the ferromagnetic patch 110. The second metal conductive lines 130 are disposed on the second surface E2 of the ferromagnetic patch 110. In some embodiments, the first metal conductive lines 120 and the second metal conductive lines 130 have straight-line shapes with equal widths. In alternative embodiments, adjustments are made such that the first metal conductive lines 120 and the second metal conductive lines 130 have straight-line shapes with different widths. The metal connection elements 140 penetrate the ferromagnetic patch 110. For example, the ferromagnetic patch 110 may have multiple via holes, and the metal connection elements 140 may be disposed in the via holes, respectively. The metal connection elements 140 further connect the first metal conductive lines 120 to the second metal conductive lines 130, respectively, and therefore a coil structure for surrounding the ferromagnetic patch 110 is formed by the first metal conductive lines 120, the metal connection elements 140, and the second metal conductive lines 130. In some embodiments, the total number of turns of the aforementioned coil structure is 4. That is, the total number of first metal conductive lines 120 is 4, and the total number of second metal conductive lines 130 is also 4.

More particularly, the first metal conductive lines 120 have vertical projections on the second surface E2 of the ferromagnetic patch 110, and the vertical projections are not parallel to the second metal conductive lines 130, such that they are interleaved with each other and form the aforementioned coil structure. As shown in FIG. 1D, the angle θ between each vertical projection of the first metal conductive lines 120 and each second metal conductive line 130 is from 0 to 45 degrees. In some embodiments, the angle θ is from 10 to 15 degrees. In some embodiments, any two adjacent first metal conductive lines 120 have equal spacing D1 therebetween, and any two adjacent second metal conductive lines 130 have equal spacing D2 therebetween. For example, the spacing D1 may be from 0 mm to 10 mm, and the spacing D2 may also be from 0 mm to 10 mm.

Figure 2:
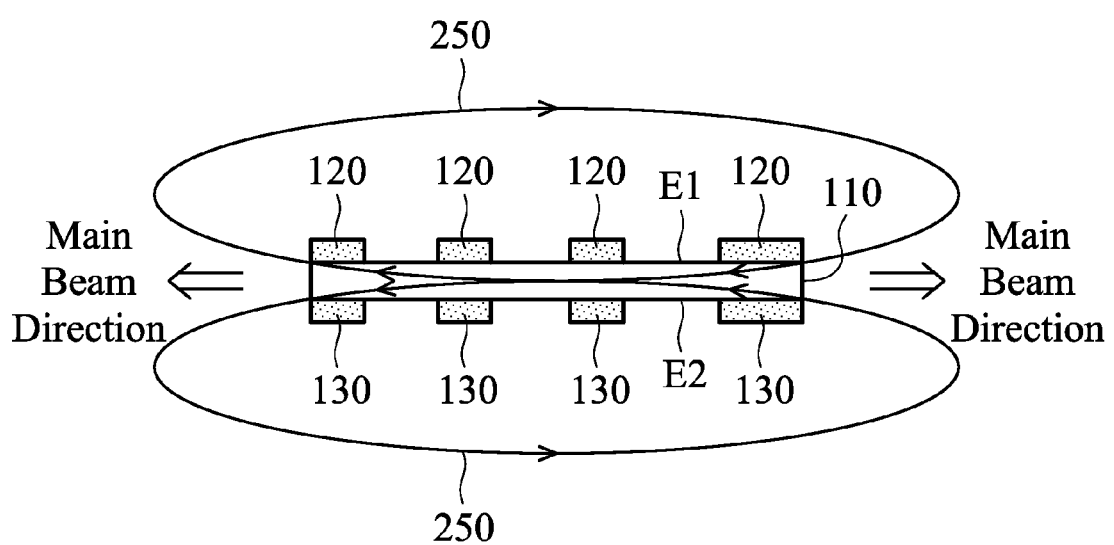
FIG. 2 is a diagram of magnetic force lines of an antenna structure according to an embodiment of the invention.

FIG. 2 is a diagram of magnetic force lines of the antenna structure 100 according to an embodiment of the invention. In some embodiments, the antenna structure 100 operates in an NFC (Near Field Communication) frequency band or a wirelessly-charging frequency band. Since the first metal conductive lines 120, the metal connection elements 140, and the second metal conductive lines 130 form a coil structure surrounding the ferromagnetic patch 110, magnetic force lines 250 and main radiation pattern of the antenna structure 100 will radiate from sides of the ferromagnetic patch 110, rather than front or back portions of the ferromagnetic patch 110. In other words, the main radiation direction (or the main beam direction) of the antenna structure 100 is parallel to the first surface E1 and the second surface E2 of the ferromagnetic patch 110, so as to provide lateral radiation. The invention further includes some different embodiments. Please refer to the following figures and descriptions.

Figure 3A:
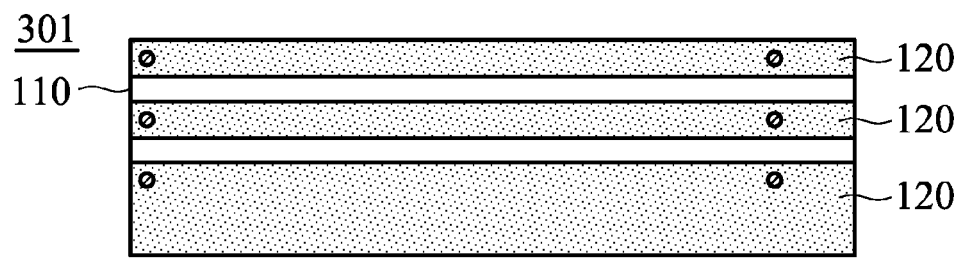
FIG. 3A is a front view of an antenna structure according to an embodiment of the invention.
Figure 3B:
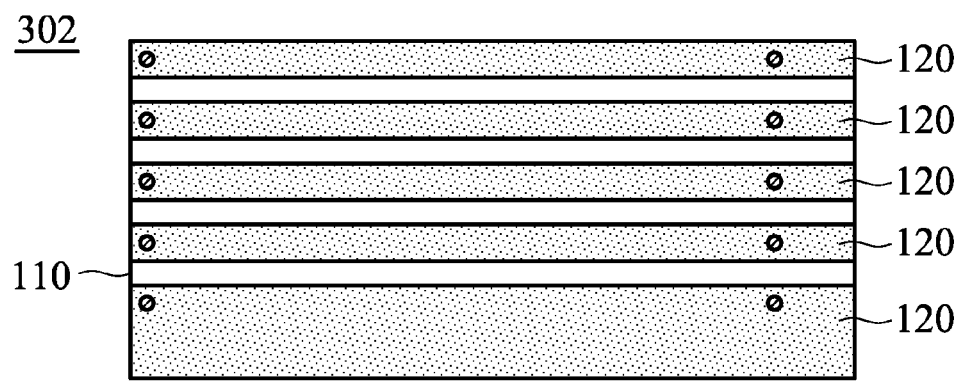
FIG. 3B is a front view of an antenna structure according to an embodiment of the invention.
Figure 3C:
FIG. 3C is a front view of an antenna structure according to an embodiment of the invention.

FIG. 3A is a front view of an antenna structure 301 according to an embodiment of the invention. In the embodiment of FIG. 3A, the total number of turns of a coil structure of the antenna structure 301 is 3. That is, the total number of first metal conductive lines 120 is 3, and the total number of second metal conductive lines 130 is also 3. FIG. 3B is a front view of an antenna structure 302 according to an embodiment of the invention. In the embodiment of FIG. 3B, the total number of turns of a coil structure of the antenna structure 302 is 5. That is, the total number of first metal conductive lines 120 is 5, and the total number of second metal conductive lines 130 is also 5. FIG. 3C is a front view of an antenna structure 303 according to an embodiment of the invention. In the embodiment of FIG. 3C, the total number of turns of a coil structure of the antenna structure 303 is 6. That is, the total number of first metal conductive lines 120 is 6, and the total number of second metal conductive lines 130 is also 6. It should be understood that other views of the antenna structures 301, 302, and 303 are determined by the front views, and they are not displayed for simplification. By adjusting the total number of turns of the coil structure, the antenna structure can provide different inductances for application at a variety of frequencies. For example, if the size of the ferromagnetic patch 110 becomes smaller, the total number of first metal conductive lines 120 and the total number of second metal conductive lines 130 may be both increased, so as to increase the inductance of the coil structure, and if the size of the ferromagnetic patch 110 becomes larger, the total number of first metal conductive lines 120 and the total number of second metal conductive lines 130 may be both decreased, so as to decrease the inductance of the coil structure. Other features of the antenna structures 301, 302, and 303 of FIGS. 3A, 3B, and 3C are similar to those of the antenna structure 100 of FIGS. 1A, 1B, 1C, and 1D. As a result, these embodiments can achieve similar levels of performance.

Figure 4A:
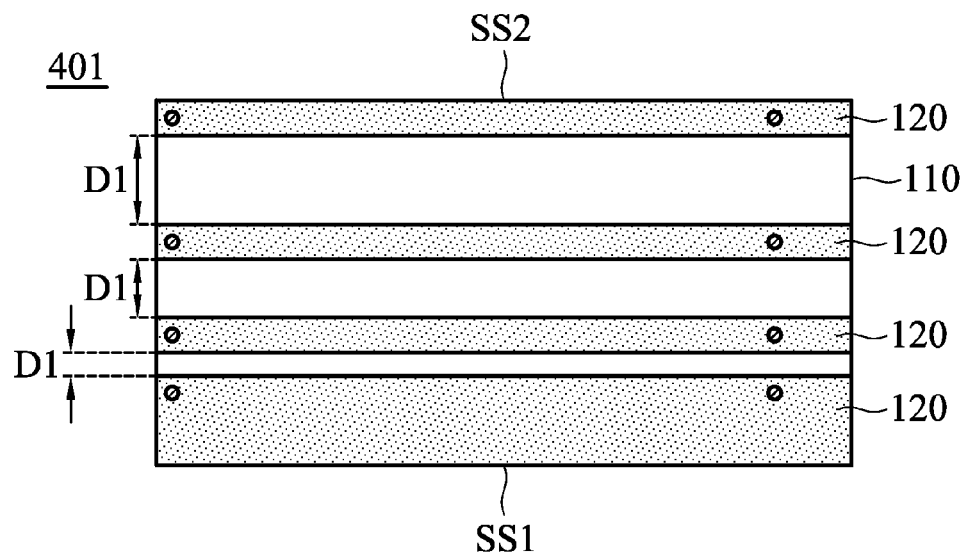
FIG. 4A is a front view of an antenna structure according to an embodiment of the invention.
Figure 4B:
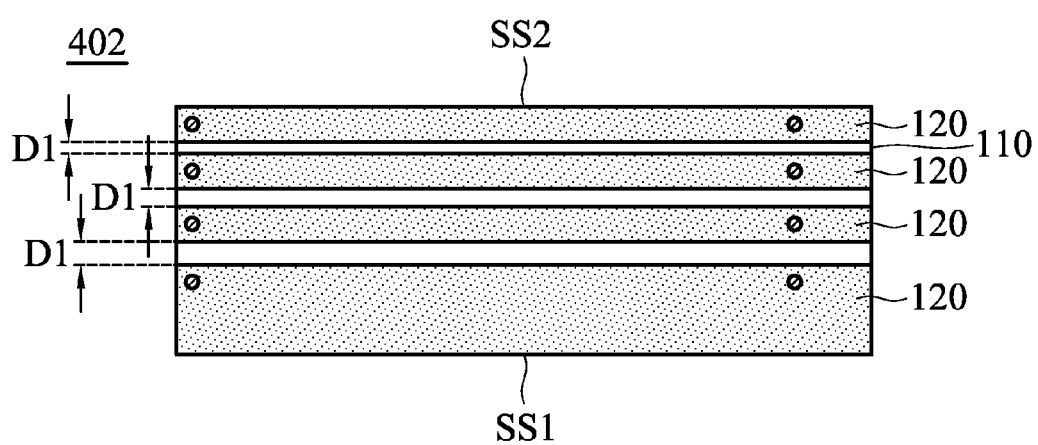
FIG. 4B is a front view of an antenna structure according to an embodiment of the invention.

FIG. 4A is a front view of an antenna structure 401 according to an embodiment of the invention. In the embodiment of FIG. 4A, the spacing D1 between any two adjacent first metal conductive lines 120 is different, and the spacing D2 between any two adjacent second metal conductive lines 130 is different (not shown). More particularly, from a first side SS1 to a second side SS2 of the ferromagnetic patch 110, the spacing D1 of the first metal conductive lines 120 and the spacing D2 of the second metal conductive lines 130 both gradually become wider. FIG. 4B is a front view of an antenna structure 402 according to an embodiment of the invention. In the embodiment of FIG. 4B, the spacing D1 between any two adjacent first metal conductive lines 120 is different, and the spacing D2 between any two adjacent second metal conductive lines 130 is different (not shown). More particularly, from a first side SS1 to a second side SS2 of the ferromagnetic patch 110, the spacing D1 of the first metal conductive lines 120 and the spacing D2 of the second metal conductive lines 130 both gradually become narrower. It should be understood that other views of the antenna structures 401 and 402 are determined by the front views, and they are not displayed for simplification. By adjusting spacing between metal conductive lines, the antenna structure can have different impedance values, so as to provide a variety of impedance matching characteristics. Other features of the antenna structures 401 and 402 of FIGS. 4A and 4B are similar to those of the antenna structure 100 of FIGS. 1A, 1B, 1C, and 1D. As a result, these embodiments can achieve similar levels of performance.

Figure 5A:
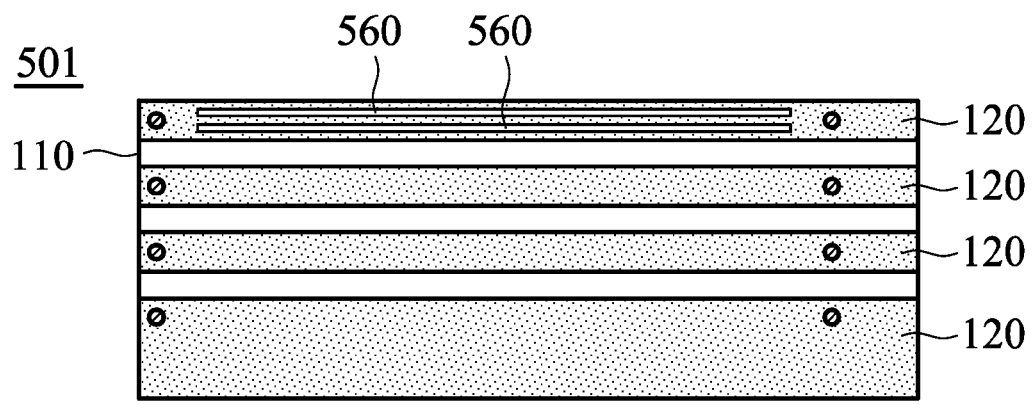
FIG. 5A is a front view of an antenna structure according to an embodiment of the invention.
Figure 5B:
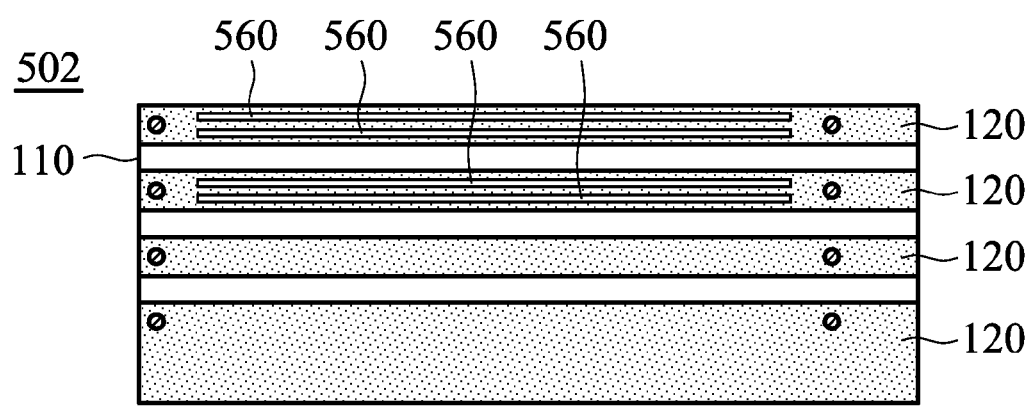
FIG. 5B is a front view of an antenna structure according to an embodiment of the invention.

FIG. 5A is a front view of an antenna structure 501 according to an embodiment of the invention. In the embodiment of FIG. 5A, one of the first metal conductive lines 120 or one of the second metal conductive lines 130 has multiple slots 560 (e.g., the slots 560 may be parallel to each other). For example, the slots 560 may have narrow, long rectangular shapes, or may have width-varying straight-line shapes. FIG. 5B is a front view of an antenna structure 502 according to an embodiment of the invention. In the embodiment of FIG. 5B, some of the first metal conductive lines 120 or some of the second metal conductive lines 130 have multiple slots 560. For example, the slots 560 may have narrow, long rectangular shapes, or may have width-varying straight-line shapes. It should be understood that other views of the antenna structures 501 and 502 are determined by the front views, and they are not displayed for simplification. By adding the slots 560 to the first metal conductive lines 120 or the second metal conductive lines 130, the antenna structure has more current branch paths, so as to increase the strength and range of the magnetic field. Other features of the antenna structures 501 and 502 of FIGS. 5A and 5B are similar to those of the antenna structure 100 of FIGS. 1A, 1B, 1C, and 1D. As a result, these embodiments can achieve similar levels of performance.

The following embodiments describe a method for manufacturing the antenna structure of the invention. The method includes multiple steps. The following drawings represent intermediate or finished antenna structure products corresponding to the respective steps of the method, for the reader to easily comprehend. It should be understood that these steps of the method for manufacturing the antenna structure are not required to be performed in order of the drawings. In response to different user requirements, any one or more steps of the method may be omitted.

Figure 6:
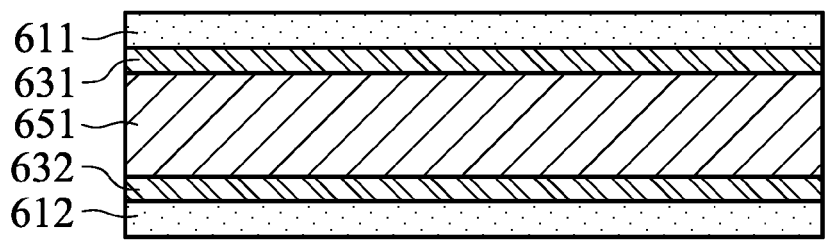
FIG. 6 is a cross-sectional view of an antenna structure in one step of the manufacturing method according to an embodiment of the invention.

FIG. 6 is a cross-sectional view of an antenna structure in one step of the manufacturing method according to an embodiment of the invention. In the step of FIG. 6, a ferromagnetic patch 610 is provided. As shown in FIG. 6, the ferromagnetic patch 610 includes a first PET (Polyethylene Terephthalate, PET) layer 611, a second PET layer 612, a first gel layer 631, a second gel layer 632, and a ferrite layer 651. The first gel layer 631 is configured to adhere the first PET layer 611 to the ferrite layer 651. The second gel layer 632 is configured to adhere the second PET layer 612 to the ferrite layer 651. The ferrite layer 651 is disposed between the first PET layer 631 and the second PET layer 632.

Figure 7:
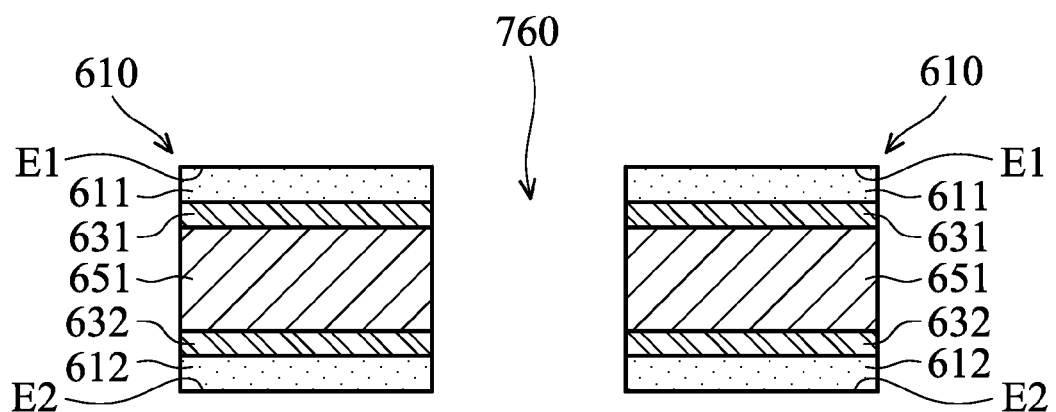
FIG. 7 is a cross-sectional view of an antenna structure in one step of the manufacturing method according to an embodiment of the invention.

FIG. 7 is a cross-sectional view of the antenna structure in one step of the manufacturing method according to an embodiment of the invention. In the step of FIG. 7, at least one via hole 760 is formed through the ferromagnetic patch 610, and the via hole 760 is connected between a first surface E1 and a second surface E2 of the ferromagnetic patch 610. The first surface E1 is opposite to the second surface E2. It should be understood that in fact, the via hole 760 does not divide the ferromagnetic patch 610 into two separate pieces. The layout of FIG. 7 is used for the reader to easily comprehend; however, in fact, the two pieces of the ferromagnetic patch 610 are partially connected to each other, and the size of the via hole 760 is much smaller than that of the ferromagnetic patch 610. The via hole 760 has a small diameter, such as 0.5 mm. In other embodiments, the method for manufacturing the antenna structure includes the steps of forming multiple via holes 760 through the ferromagnetic patch 610, such as six, eight, ten or twelve via holes 760.

Figure 8:
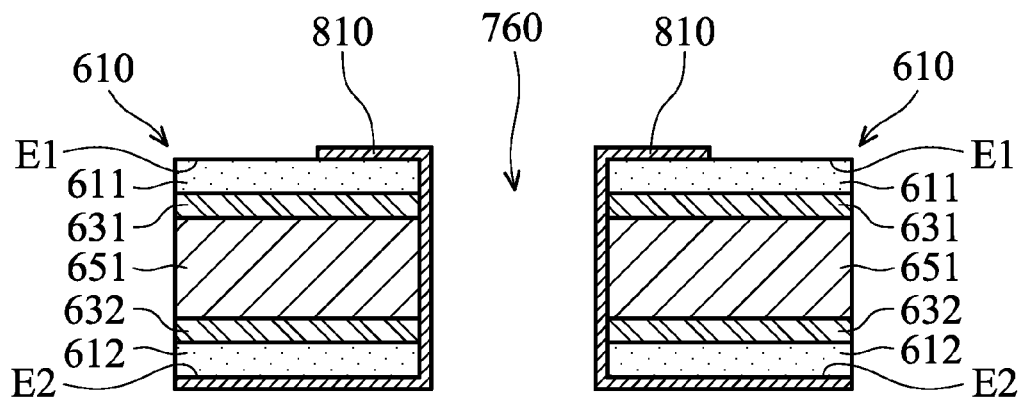
FIG. 8 is a cross-sectional view of an antenna structure in one step of the manufacturing method according to an embodiment of the invention.

FIG. 8 is a cross-sectional view of the antenna structure in one step of the manufacturing method according to an embodiment of the invention. In the step of FIG. 8, a nonconductive ink layer 810 is formed on the first surface E1 and the second surface E2 and in the via hole 760 of the ferromagnetic patch 610. That is, the nonconductive ink layer 810 extends from the first surface E1 through the via hole 760 to the second surface E2 of the ferromagnetic patch 610. Similarly, the layout of FIG. 8 is used for the reader to easily comprehend, and in fact, two portions of the nonconductive ink layer 810 on the two pieces of the ferromagnetic patch 610 are partially connected to each other. The nonconductive ink layer 810 includes base metal powder and epoxy. For example, the nonconductive ink layer 810 may be formed through a screen printing process, a pad printing process, or a spraying process. For example, the epoxy may be a synthesis of ECH (Epichlorohydrin) and BPA (Bisphenol A). For example, the base metal powder may include iron, nickel, zinc, or aluminum. The base metal powder may account for about 40% to 70% of the nonconductive ink layer 810.

Figure 9:
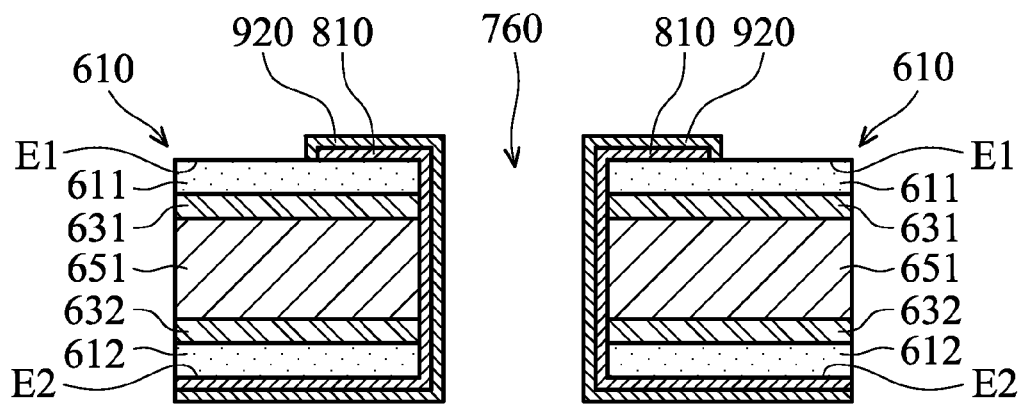
FIG. 9 is a cross-sectional view of an antenna structure in one step of the manufacturing method according to an embodiment of the invention.

FIG. 9 is a cross-sectional view of the antenna structure in one step of the manufacturing method according to an embodiment of the invention. In the step of FIG. 9, a displacement process is applied to the nonconductive ink layer 810 so as to form a first metal layer 920 on the nonconductive ink layer 810. The displacement process may include placing the ferromagnetic patch 610 and the nonconductive ink layer 810 into an aqueous solution that includes precious metal ions. The base metal powder of the nonconductive ink layer 810 may react with the precious metal ions in the aqueous solution. As a result, the base metal powder may be oxidized and dissolved in the aqueous solution, and the precious metal ions may be deoxidized so as to form the first metal layer 920. For example, the first metal layer 920 may include copper, nickel, silver, palladium, platinum, aluminum, and/or gold, and the thickness of the first metal layer 920 is smaller than or equal to 5 μm.

Figure 10:
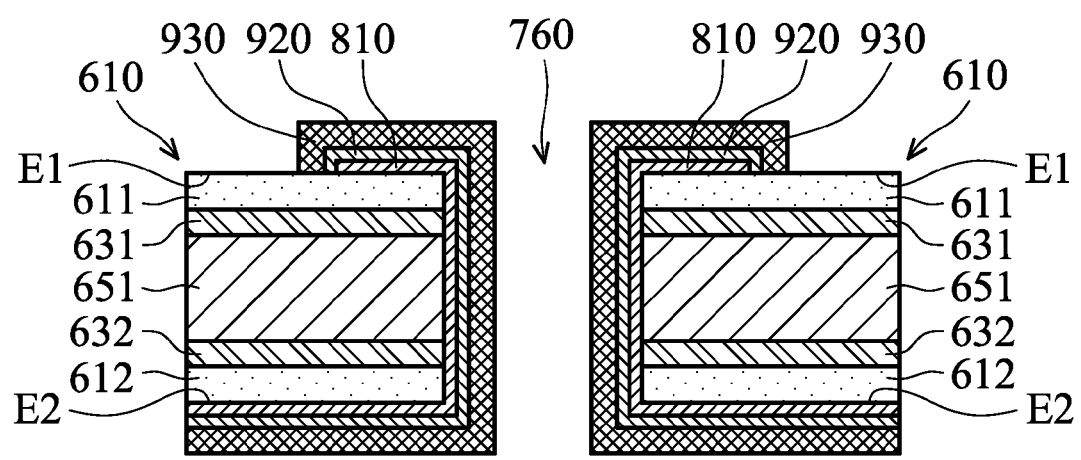
FIG. 10 is a cross-sectional view of an antenna structure in one step of the manufacturing method according to an embodiment of the invention.

FIG. 10 is a cross-sectional view of the antenna structure in one step of the manufacturing method according to an embodiment of the invention. In the step of FIG. 10, a thickening process is applied to the first metal layer 920 so as to form a second metal layer 930 on the first metal layer 920. For example, the thickening process may be a chemical-plating process or an electroplating process. The thickening process is performed so as to increase the stability of the antenna structure. The material of the second metal layer 930 may be the same as that of the first metal layer 920. For example, the second metal layer 930 may include copper, nickel, silver, palladium, platinum, aluminum, and/or gold, and the thickness of the second metal layer 930 is from 2 μm to 40 μm. The first metal layer 920 and the second metal layer 930 both extend from the first surface E1 through the via hole 760 to the second surface E2 of the ferromagnetic patch 610. Adjustments may be made such that the second metal layer 930 completely fills the via hole 760 of the ferromagnetic patch 610 when the thickening process has been performed (not shown).

Please refer to FIG. 1A, FIG. 1B, FIG. 1C, and FIG. 1D again. In the method of FIGS. 6 to 10, the first metal layer 920 and the second metal layer 930 on the first surface E1 and the second surface E2 may be considered as the first metal conductive lines 120 and the second metal conductive lines 130 disposed on the ferromagnetic patch 110. Furthermore, the first metal layer 920 and the second metal layer 930 disposed in the via hole 760 may be considered as the metal connection elements 140 penetrating the ferromagnetic patch 110. The antenna structure of the invention may be made by using the method of FIGS. 6-10, and it can achieve all-in-one and thin characteristics.

Figure 11A:
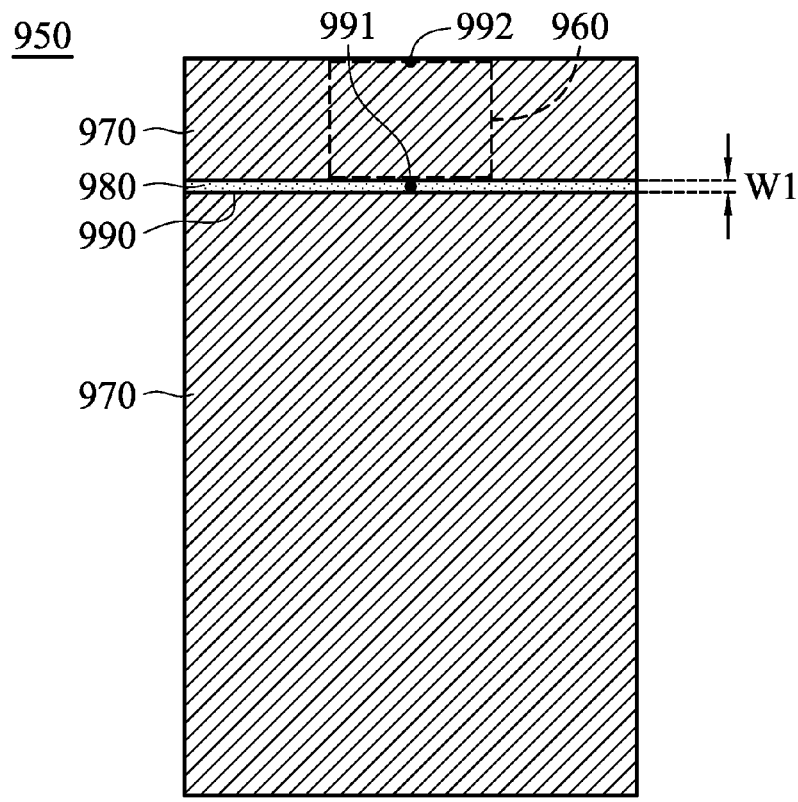
FIG. 11A is a front view of a mobile device according to an embodiment of the invention.
Figure 11B:
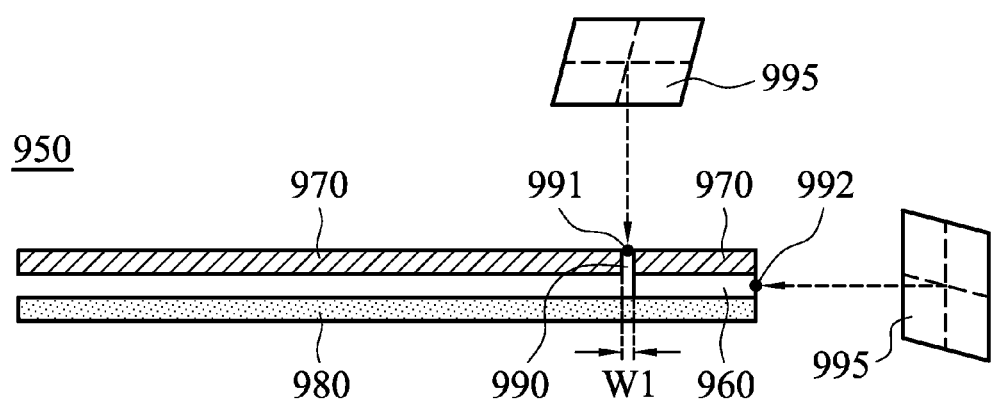
FIG. 11B is a cross-sectional view of a mobile device according to an embodiment of the invention.

FIG. 11A is a front view of a mobile device 950 according to an embodiment of the invention. FIG. 11B is a cross-sectional view of the mobile device 950 according to an embodiment of the invention. Please refer to FIG. 11A and FIG. 11B together. An antenna structure 960 may be applied in the mobile device 950. The antenna structure 960 may be one of those described in the embodiments of FIGS. 1A to 5B. The antenna structure 960 is disposed between a first metal plane 970 and a second metal plane 980 of the mobile device 950. The first metal plane 970 has a slot gap 990. For example, the first metal plane 970 may be a metal housing of the mobile device 950, and the second metal plane 980 may be a circuit board, but they are not limited thereto. The slot gap 990 may substantially have a straight-line shape with a width W1, which may be greater than 0.5 mm, and preferably 2 mm. The first metal plane 970 and the second metal plane 980 may be substantially parallel to each other, and they may substantially have rectangular shapes. The first metal plane 970 may be divided into two portions by the slot gap 990. The radiation energy of the antenna structure 960 may be transmitted outwardly through the slot gap 990. As a result, if a proximity card 995 is moved to the front of the mobile device 950 (i.e., adjacent to the slot gap 990), the proximity card 995 will receive signals through a first detection point 991 from the antenna structure 960. On the other hand, if the proximity card 995 is moved to the top of the mobile device 950 (i.e., adjacent to a side clearance between the first metal plane 970 and the second metal plane 980), the proximity card 995 will receive signals through a second detection point 992 from the antenna structure 960. According to the embodiments of FIG. 11A and FIG. 11B, the antenna structure 960 may be combined with the mobile device 950, so as to provide a variety of paths for signal reception and transmission and improve convenience.

Figure 12A:
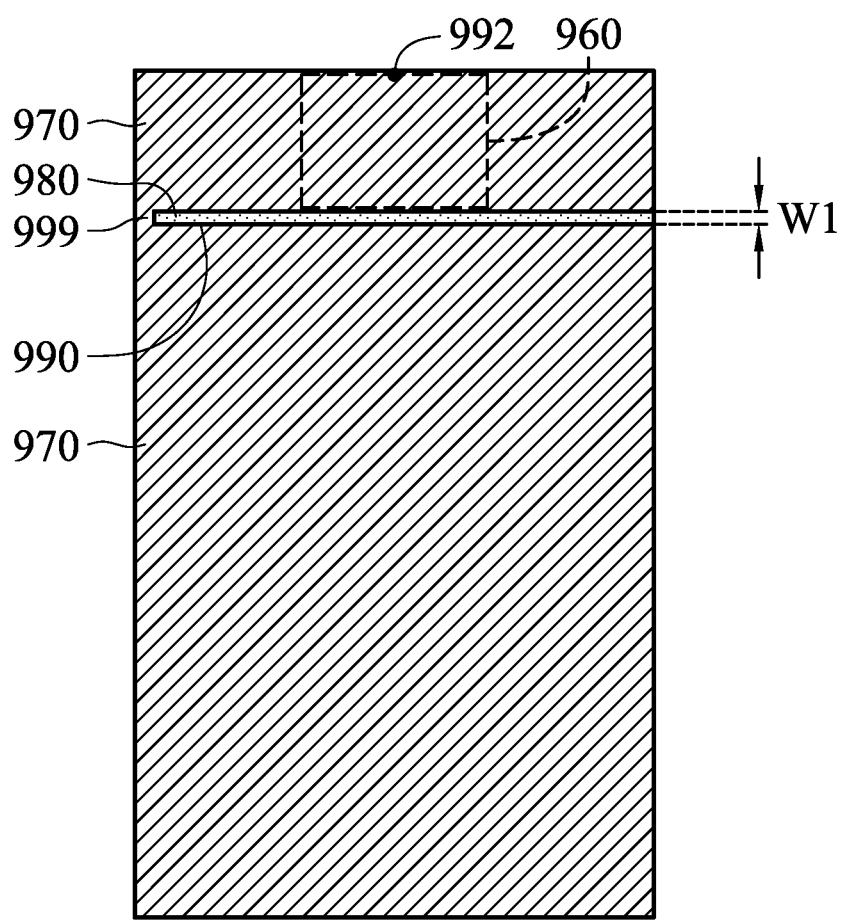
FIG. 12A is a front view of a mobile device according to an embodiment of the invention.
Figure 12B:
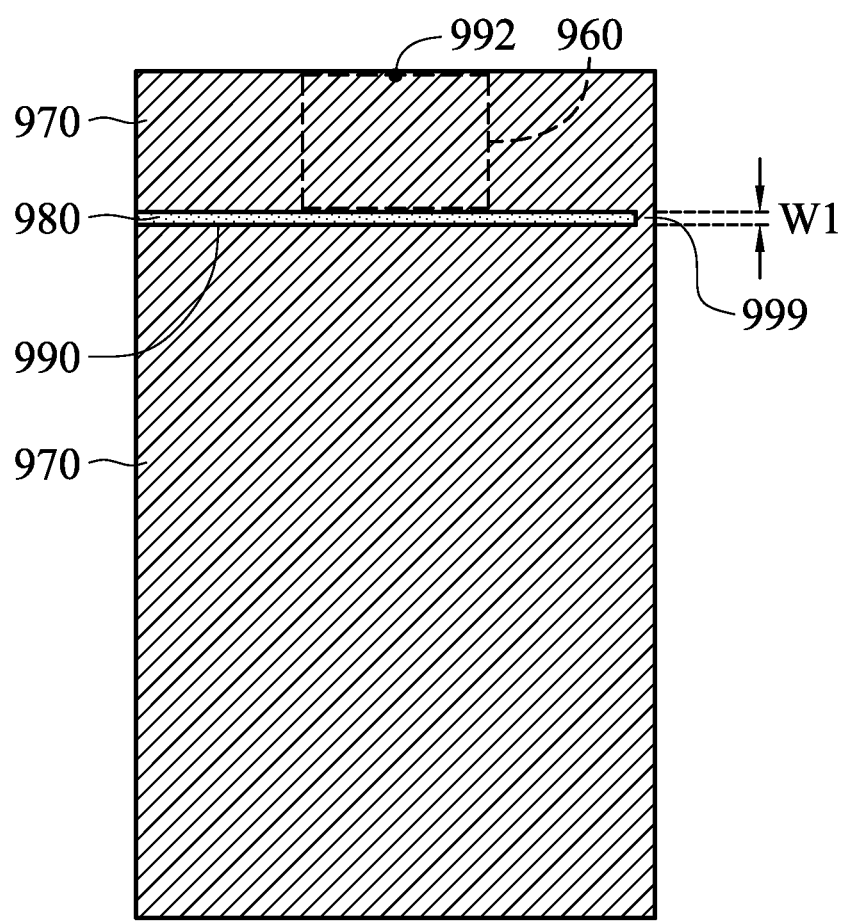
FIG. 12B is a front view of a mobile device according to an embodiment of the invention.

FIG. 12A is a front view of a mobile device 996 according to an embodiment of the invention. FIG. 12A is similar to FIG. 11A and FIG. 11B. The difference between the two embodiments is that the mobile device 996 further includes a metal connection component 999. The metal connection component 999 may extend across the slot gap 990 of the first metal plane 970, and may be coupled between the two separate portions of the first metal plane 970. The metal connection component 999 may be an independent element, or may be integrated with the first metal plane 970. In the embodiment of FIG. 12A, the metal connection component 999 is adjacent to the left side of the mobile device 996. FIG. 12B is a front view of a mobile device 997 according to an embodiment of the invention. In the embodiment of FIG. 12B, a metal connection component 999 is adjacent to the right side of the mobile device 997.

Figure 12C:
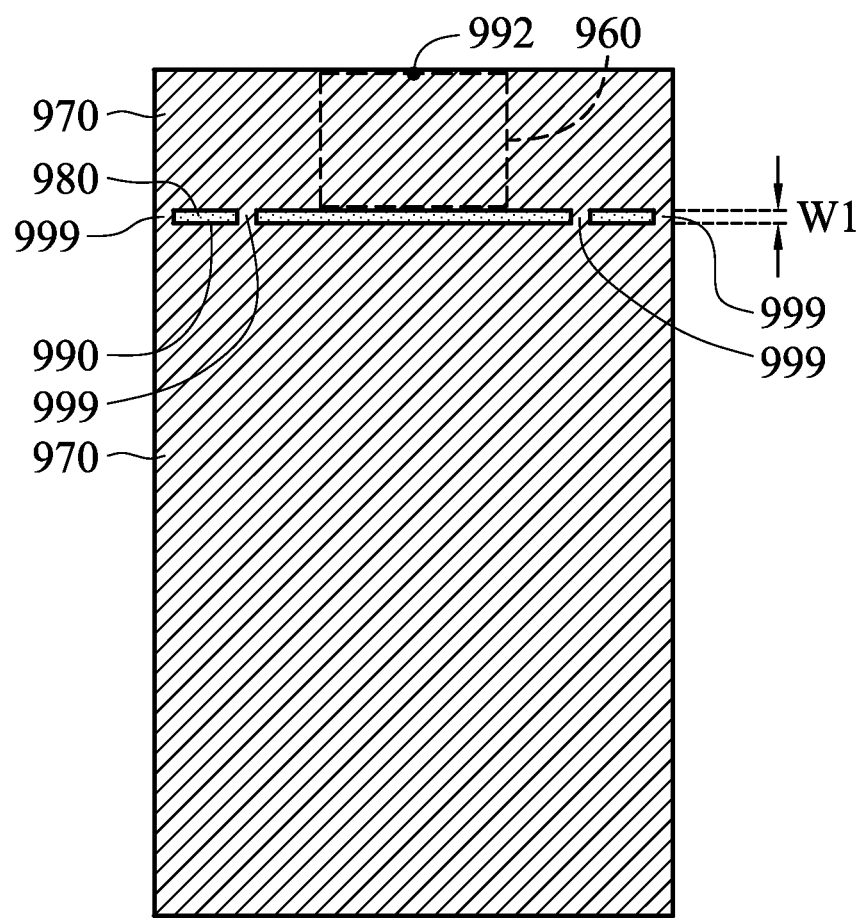
FIG. 12C is a front view of a mobile device according to an embodiment of the invention.

FIG. 12C is a front view of a mobile device 998 according to an embodiment of the invention. FIG. 12C is similar to FIG. 12A and FIG. 12B. The difference between the two embodiments is that the mobile device 998 further includes multiple metal connection components 999. The metal connection components 999 may extend across the slot gap 990 of the first metal plane 970, and may be coupled between the two separate portions of the first metal plane 970. The metal connection components 999 may be independent elements, or may be integrated with the first metal plane 970. In the embodiment of FIG. 12C, the metal connection components 999 are adjacent to both the left side and right side of the mobile device 998.

In comparison to the prior art, the invention has at least the following advantages: (1) reducing the total thickness by integrating the antenna structure with the ferromagnetic patch, (2) simplifying the process for assembling and manufacturing the antenna structure, (3) decreasing the total cost of manufacturing the antenna structure, and (4) providing different radiation patterns. Therefore, the invention is suitable for application in a variety of small-size mobile communication devices.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
a ferromagnetic patch, having a first surface and a second surface, wherein the second surface is opposite to the first surface;
a plurality of first metal conductive lines, disposed on the first surface;
a plurality of second metal conductive lines, disposed on the second surface; and
a plurality of metal connection elements, penetrating the ferromagnetic patch, wherein the metal connection elements connect the first metal conductive lines to the second metal conductive lines, respectively,
wherein the ferromagnetic patch comprises a first PET (Polyethylene Terephthalate, PET) layer, a second PET layer, a first gel layer, a second gel layer, and a ferrite layer, the first gel layer is configured to adhere the first PET layer to the ferrite layer, the second gel layer is configured to adhere the second PET layer to the ferrite layer, and the ferrite layer is disposed between the first PET layer and the second PET layer.

2. The antenna structure as claimed in claim 1, wherein a coil structure for surrounding the ferromagnetic patch is formed by the first metal conductive lines, the metal connection elements, and the second metal conductive lines.

3. The antenna structure as claimed in claim 1, wherein the antenna structure operates in an NFC (Near Field Communication) frequency band.

4. The antenna structure as claimed in claim 1, wherein a main beam of the antenna structure is arranged in a direction parallel to the first surface and the second surface.

5. The antenna structure as claimed in claim 1, wherein the first metal conductive lines have a plurality of vertical projections on the second surface, and the vertical projections are not parallel to the second metal conductive lines, wherein an angle between each of the vertical projections and each of the second metal conductive lines is from 0 to 45 degrees.

6. The antenna structure as claimed in claim 1, wherein spacing between any two adjacent first metal conductive lines is from 0 mm to 10 mm, and spacing between any two adjacent second metal conductive lines is from 0 mm to 10 mm.

7. The antenna structure as claimed in claim 1, wherein the total number of first metal conductive lines is three or more, and the total number of second metal conductive lines is three or more.

8. The antenna structure as claimed in claim 1, wherein spacing between any two adjacent first metal conductive lines is different, and spacing between any two adjacent second metal conductive lines is different.

9. The antenna structure as claimed in claim 1, wherein one or more of the first metal conductive lines and/or one or more of the second metal conductive lines have a plurality of slots.

10. The antenna structure as claimed in claim 1, wherein the first metal conductive lines, the second metal conductive lines, and the metal connection elements are formed by a first metal layer and a second metal layer.

11. The antenna structure as claimed in claim 10, wherein the first metal layer is formed on a nonconductive ink layer by applying a displacement process to the nonconductive ink layer.

12. The antenna structure as claimed in claim 11, wherein the second metal layer is formed on the first metal layer by applying a thickening process to the first metal layer.

13. The antenna structure as claimed in claim 11, wherein the nonconductive ink layer comprises base metal powder and epoxy.

14. The antenna structure as claimed in claim 10, wherein the first metal layer and the second metal layer each comprise copper, nickel, silver, palladium, platinum, aluminum, or gold.

15. The antenna structure as claimed in claim 1, wherein the antenna structure is combined with a mobile device, such that a proximity card receives radiation energy in multiple directions from the mobile device.

16. A mobile device, comprising:
a first metal plane, having a slot gap;
a second metal plane; and
an antenna structure as claimed in claim 1, wherein the antenna structure is disposed between the first metal plane and the second metal plane.

17. The mobile device as claimed in claim 16, wherein radiation energy of the antenna structure is transmitted outwardly through the slot gap.

18. The mobile device as claimed in claim 16, wherein radiation energy of the antenna structure is transmitted outwardly through a side clearance between the first metal plane and the second metal plane.

19. The mobile device as claimed in claim 16, further comprising:
one or more metal connection components, wherein the first metal plane is divided into two portions by the slot gap, and the metal connection components extend across the slot gap and are coupled between the portions of the first metal plane.

* * * * *